United States Patent [19]

Snow

[11] Patent Number: 5,652,578
[45] Date of Patent: Jul. 29, 1997

[54] HOME BASE DIRECTIONAL INDICATOR

[76] Inventor: Donald Snow, 115 Dunham Close, Red Deer, Alberta, Canada, T4R 2J2

[21] Appl. No.: 522,168

[22] Filed: Jun. 9, 1995

[51] Int. Cl.⁶ .................................................. G08G 1/123
[52] U.S. Cl. .......................... 340/988; 340/991; 340/539; 340/573; 340/825.49; 342/419; 342/443; 342/458
[58] Field of Search ...................... 340/988, 991, 340/539, 825.49, 573; 342/419, 443, 458, 459, 385

[56] References Cited

U.S. PATENT DOCUMENTS

| | | | |
|---|---|---|---|
| 3,366,958 | 1/1968 | Seaborn | 342/458 |
| 3,626,416 | 12/1971 | Rabow | 342/419 |
| 3,965,425 | 6/1976 | Peterson et al. | 342/419 |
| 4,001,828 | 1/1977 | Culpepper | 342/419 |
| 4,003,060 | 1/1977 | Broce et al. | 342/419 |
| 4,071,845 | 1/1978 | Gross | 342/443 |
| 4,475,106 | 10/1984 | Andrews | 342/419 |
| 4,528,566 | 7/1985 | Tyler | 342/419 |
| 4,673,921 | 6/1987 | Saito et al. | 340/539 |
| 5,289,163 | 2/1994 | Perez et al. | 340/539 |
| 5,337,041 | 8/1994 | Friedman | 340/573 |

*Primary Examiner*—Jeffery Hofsass
*Assistant Examiner*—Benjamin C. Lee
*Attorney, Agent, or Firm*—G. F. Gallinger

[57] ABSTRACT

A method and apparatus for campers, hikers, and hunters enjoying the out-of-doors and nature in the wilderness is disclosed. In the preferred embodiment of the invention the transmitter is adapted to be plugged into the cigarette lighter in a vehicle and is fitted with an antenna which can be magnetically adhered to the roof of the vehicle. The transmitter emits a distinctive warble tone. The receiver is configured with a telescoping antenna and an audio level meter to more accurately determine the direction of maximum signal strength. The apparatus is inexpensive, as well as being simple and convenient to use.

10 Claims, 2 Drawing Sheets

HOME BASE DIRECTIONAL INDICATOR

BACKGROUND OF THE INVENTION

This invention relates to position identifying systems. More particularly this invention relates to devices employed by campers, hikers, hunters, and other sportsmen in the wilderness used to maintain their bearings and insure against the possibility of becoming lost.

The traditional instrument used by sportsmen to maintain their bearings is the compass. The problem with the compass is that it is difficult to use. For example, if a hunter chases an animal around in a circle, later learning which way is north is not likely to be of much help in guiding him back to his vehicle.

More recently global positioning systems have become available to sportsmen. The size of these receivers while still burdensome has greatly improved. One problem with global positioning systems is that their method of use is somewhat of a trial and error process; a cognitive determination is required which is beyond the skill of children and the training of many adults. In extreme cold, blizards, or other exhaustive conditions the use of global positioning systems requires a lot of concentration. Another problem with global positioning systems is that their cost is prohibitive for most outdoor enthusiasts.

OBJECTS AND STATEMENT OF THE INVENTION

It is an object of this invention to provide an apparatus and method of directing sportsmen and children back to a camp, or home base in the wilderness. It is an object of this invention to provide an apparatus which is convenient to use and easy to carry. It is yet a further object of this invention to provide an apparatus which is relatively inexpensive to manufacture and affordable to use.

One aspect of this invention provides for a method of determining the direction of a home base in the out-of-doors comprising the following steps: broadcasting in a continuous signal from a home base transmitter; carrying a receiver; and determining the direction of the home base with respect to the receiver by determining in which direction with respect to the receiver, that the signal is strongest.

A preferred aspect of this invention further provides for the step of magnetically adhering an antenna on the exterior of a vehicle, plugging a home base transmitter into a cigarette lighter receptacle on the vehicle and broadcasting a warble tone from the transmitter.

Various other objects, advantages and features of this invention will become apparent to those skilled in the art from the following description in conjunction with the accompanying drawings.

FIGURES OF THE INVENTION

Figure 1:
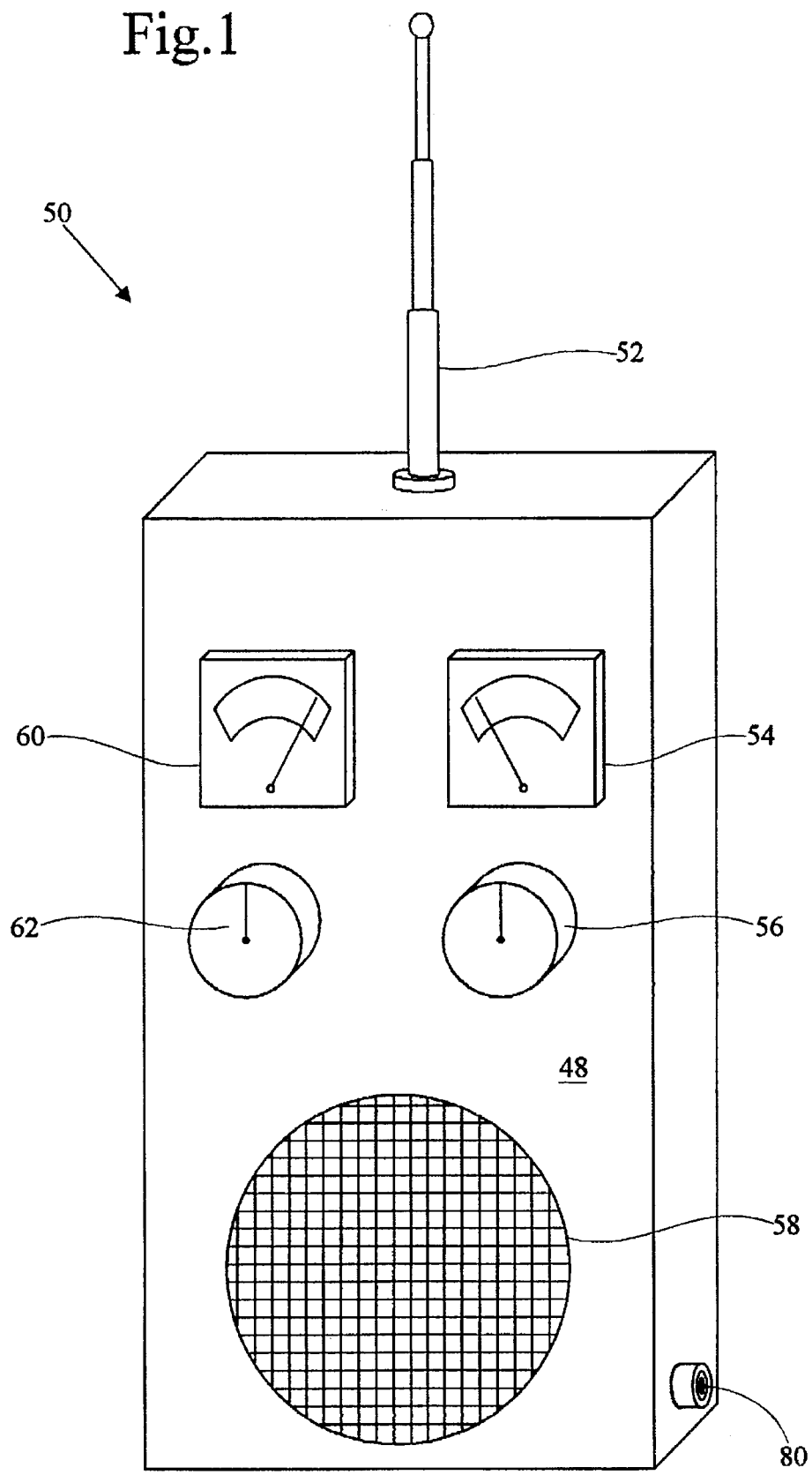
FIG. 1 is a perspective view of a preferred embodiment of a Home Base Directional Indicator receiver.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Figure 3:
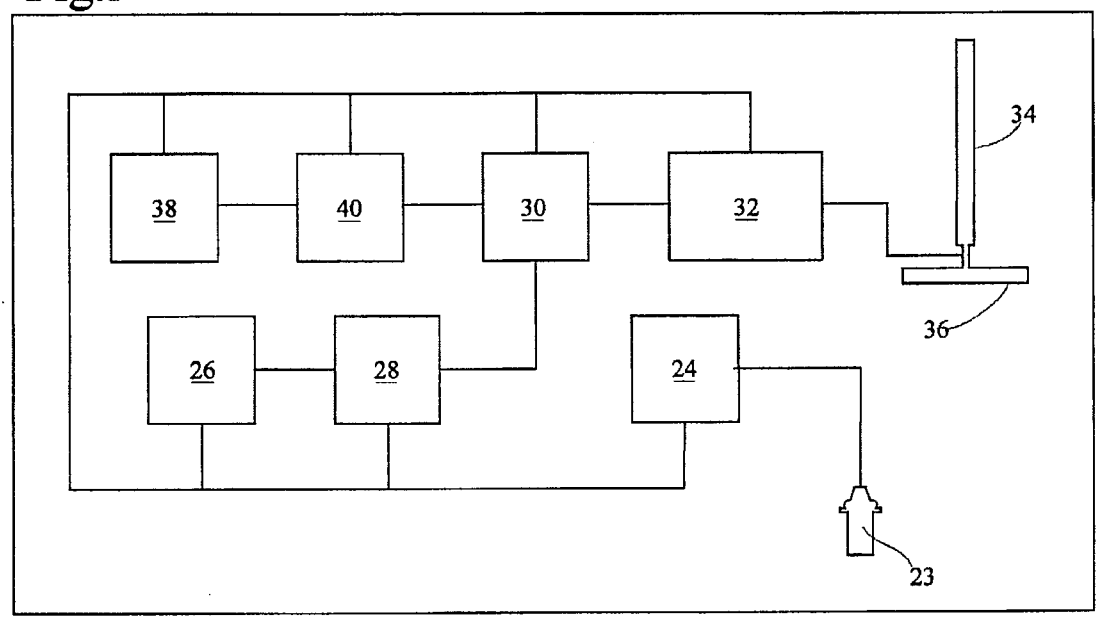
FIG. 3 is a block diagram of the components in the Home Base Directional Indicator transmitter.

Turning now to the drawings and more particularly to FIG. 1 we have a perspective view of a Home Base Directional Indicator receiver 50. The Home Base Directional Indicator system comprises a receiver 50 and a transmitter 21. The Home Base Directional Indicator transmitter 21 shown in FIG. 3 is adapted to operate on 12 VDC. A cigarette lighter receptacle power plug 23 taps the electrical power supply in a vehicle (not shown). A transformer 24 further reduces this input voltage to power the components of the transmitter 21. A warble tone oscillator 26 generates a bitonal output tone. A bitonal output has been found not only to be more distinctive than a monotone, but also less fatiguing to a listener. The output from the warble tone oscillator 26 is first amplified in an audio amplifier 28. It is further amplified in an intermediate power amplifier 30, and finally amplified in a power amplifier 32 before being outputed to a broadcast antenna 34 which is positioned on the exterior of a vehicle (not shown) by a mounting magnet 36. A second oscillator 38 is also outputed through a buffer 40 to the intermediate power amplifier 32.

The home base directional indicator transmitter 21 operates above the general radio services band. Canadian government regulations limit broadcast power to 5 watts unmodulated carrier power (which with double sideband will be 10 watts) without licensing. Only the following general carrier frequencies are permitted 26.995, 27.045, 27.095, 27.145 and 27.195 MHz. Of these frequencies the lowest, 26.995 is preferred because it radiates furthest. American government regulations permit the same power and frequencies as are available in Canada, but additionally allow 25 watts at 27.255 MMz for license exempt use.

The broadcast signal may be picked up by a hand held receiver 50. FIG. 1 shows the external configuration of the receiver 50. The receiver 50 comprises a telescoping antenna 52, an audio level meter 54, and an volume control 56 positioned on the front face portion 48 of the receiver 50. A radio frequency level meter 60 and a radio frequency amplification scale dial 62 are positioned on the front face portion 48 thereof. A speaker 58 broadcasts the warble tone received by the receiver 50.

Figure 2:
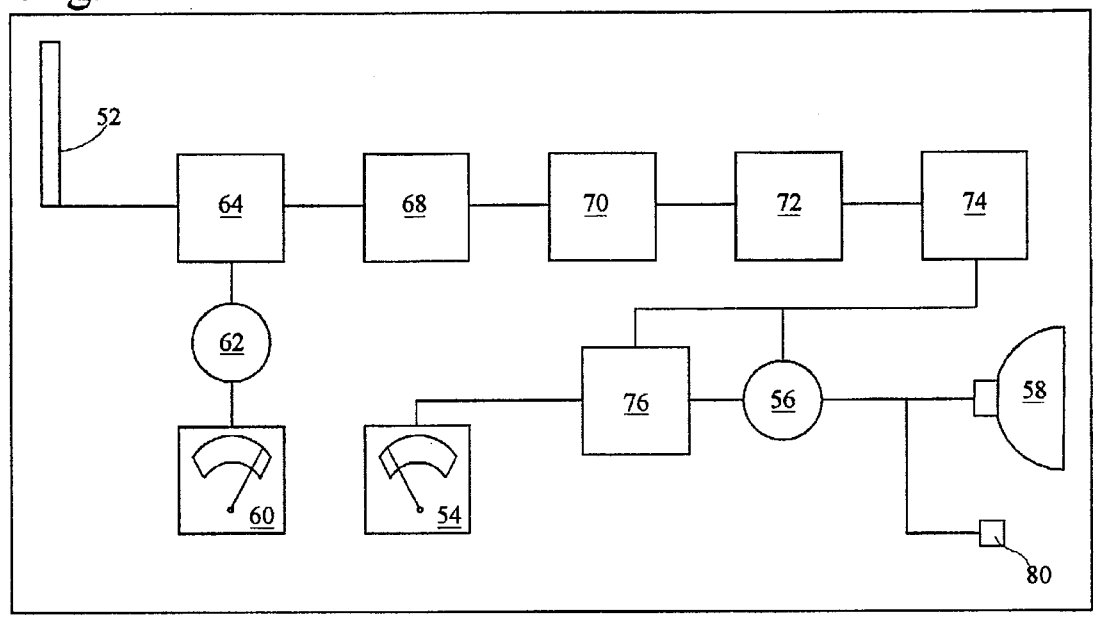
FIG. 2 is a block diagram of the components in the receiver shown in FIG. 1.

FIG. 2 is a block diagram of the circuit components in the receiver 50. The signal broadcast from the transmitter 21 is received by the antenna 52. The signal is then amplified by a radio frequency amplifier 64. The amplified signal is outputed to a radio frequency level meter 60 through a frequency amplification selector 62. The amplified signal is also outputed to an intermediate frequency amplifier 70 through a mixer 68. The output of the intermediate frequency amplifier 70 is then routed through an audio detector 72 to an audio amplifier 74. The output of the audio amplifier 74 is then routed to an audio driver 76 before it is displayed on an audio level meter 54 and broadcast to speaker 58 through volume control 56. A headphone jack 80 is also provided.

To operate the home base directional indicator transmitter 21, the transmitter 21 is plugged into a cigarette lighter in a vehicle (not shown). The mounting magnet 36 supporting the antenna 34 is then positioned on the vehicle's roof or hood (neither shown). The sportsman then proceeds into the wilderness. The transmitter 21 broadcasts in a radius of about five miles. When the sportsmen wishes to return he removes the receiver 50 and extends its antenna 52. He switches the receiver 50 on by rotating the volume control 56 clockwise. He then adjusts the frequency amplification scale selector 62 until the radio frequency level meter 60 reads at a lower end. Holding the receiver 50 so that its antenna 52 extends horizontally, he then rotates around pointing the antenna 52 outwardly in an arc. When the antenna 52 points generally towards the transmitter 21 situated in the vehicle (not shown) at the home base, the warble tone will be heard most loudly. To fine tune the direction the audio level meter 54 is watched. When the audio level meter 54 shows a maximum value, then the antenna 52 is pointed directly towards the home base transmitter 21. It is recommended that a distant landmark be cited in the direction of the transmitter 21. The receiver 50 can be turned off and its antenna 52 may be collapsed so that it may be pocketed. The receiver 50 has external dimensions of about 5 inches high by 3 inches wide by 1 inch deep. It is light and may be carried effortlessly. Its operation is easy and simple. It provides a direct and sure direction for the sportsman, quickly, and without any calculations.

While the invention has been described with preferred specific embodiments thereof, it will be understood that this description is intended to illustrate and not to limit the scope of the invention, which is defined by the following claims.

I claim:

1. A method of determining the direction of a home base in the out-of-doors comprising the following steps:

broadcasting a continuous signal from a home base transmitter;

carrying a receiver having one, and only one antennae, said antennae being a telescoping antennae;

said receiver having an audio output device for indicating received signal strength, and an audio level meter, said audio level meter having an input from said audio output device so that the amplitude of the audio output device is displayed:

determining the direction of the home base with respect to the receiver by extending the antennae on the receiver, holding the antennae generally parallel to the ground, and rotating therearound so that said antennae points to the home base transmitter when the signal is strongest.

2. A method as in claim 1 wherein the receiver is fitted with a frequency amplification scale selector to provide appropriate amplification at different distances from the home base transmitter.

3. A method as in claim 1 further comprising the step of magnetically adhering an antenna on the exterior of a vehicle.

4. A method as in claim 3 further comprising the step of plugging a home base transmitter into a cigarette lighter receptacle on the vehicle.

5. A method as in claim 4 further comprising the step of broadcasting a warble tone from the transmitter.

6. A method as in claim 4 wherein the home base transmitter broadcasts at a power sufficiently low to be unregulated by government regulations.

7. An apparatus for determining the direction of a home base vehicle in the out-of-doors comprising:

a home base transmitter adapted to plug into the cigarette lighter socket of the vehicle;

a hand held receiver having one, and only one antennae; said antennae being a telescoping antenna, said receiver having an audio output device for indicating received signal strength and an audio level meter, said audio level meter having art input from said audio output device so that the amplitude of the audio output device is displayed;

wherein use the direction of the home base transmitter is determined by extending the antennae on the receiver, holding the antennae generally parallel to the ground, and rotating therearound so that the antennae points 19 the home base transmitter when the signal is strongest as shown on the audio level meter.

8. An apparatus as in claim 7 wherein the home base transmitter broadcasts a warble tone.

9. An apparatus as in claim 7 wherein the home base transmitter has an antenna which can be magnetically attached to the exterior of a vehicle.

10. An apparatus as in claim 7 wherein the transmitter broadcasts at a frequency of 26.995 MHz.

* * * * *